US010557057B2

(12) United States Patent
Gopalakrishnan

(10) Patent No.: US 10,557,057 B2
(45) Date of Patent: Feb. 11, 2020

(54) HIGH MELT FLOW PAEK COMPOSITIONS

(71) Applicant: SOLVAY SPECIALTY POLYMERS USA, LLC., Alpharetta, GA (US)

(72) Inventor: Vijay Gopalakrishnan, Dunwoody, GA (US)

(73) Assignee: SOLVAY SPECIALTY POLYMERS USA, LLC., Alpharetta, GA (US)

( * ) Notice: Subject to any disclaimer, the term of this patent is extended or adjusted under 35 U.S.C. 154(b) by 390 days.

(21) Appl. No.: 14/425,389

(22) PCT Filed: Sep. 4, 2013

(86) PCT No.: PCT/EP2013/068242
§ 371 (c)(1),
(2) Date: Mar. 3, 2015

(87) PCT Pub. No.: WO2014/037375
PCT Pub. Date: Mar. 13, 2014

(65) Prior Publication Data
US 2015/0203712 A1 Jul. 23, 2015

Related U.S. Application Data

(60) Provisional application No. 61/696,546, filed on Sep. 4, 2012.

(30) Foreign Application Priority Data

Nov. 27, 2012 (EP) .................................. 12194429

(51) Int. Cl.
| | | |
|---|---|---|
| C09D 161/16 | (2006.01) | |
| B29C 48/00 | (2019.01) | |
| B29C 39/00 | (2006.01) | |
| B29C 43/00 | (2006.01) | |
| B29C 44/00 | (2006.01) | |
| B29C 45/00 | (2006.01) | |
| B29C 49/00 | (2006.01) | |
| C08K 7/06 | (2006.01) | |
| C08L 27/18 | (2006.01) | |
| C08L 71/00 | (2006.01) | |
| B29K 61/00 | (2006.01) | |
| B29K 71/00 | (2006.01) | |
| B29K 27/18 | (2006.01) | |
| B29K 307/04 | (2006.01) | |

(52) U.S. Cl.
CPC ............ *C09D 161/16* (2013.01); *B29C 39/00* (2013.01); *B29C 43/00* (2013.01); *B29C 44/00* (2013.01); *B29C 45/00* (2013.01); *B29C 48/00* (2019.02); *B29C 49/00* (2013.01); *C08K 7/06* (2013.01); *C08L 27/18* (2013.01); *C08L 71/00* (2013.01); *B29K 2027/18* (2013.01); *B29K 2061/00* (2013.01); *B29K 2071/00* (2013.01); *B29K 2307/04* (2013.01); *C08G 2650/40* (2013.01)

(58) Field of Classification Search
CPC ............ C08G 2650/00; C08G 2650/40; C09D 161/16; B29C 48/00; B29C 39/00; B29C 43/00; B29C 44/00; B29C 45/00; B29C 49/00; C08K 7/06; C08L 27/18; C08L 71/00; B29K 2027/18; B29K 2061/00; B29K 2071/00; B29K 2307/04
USPC ........................................................ 524/495
See application file for complete search history.

(56) References Cited

U.S. PATENT DOCUMENTS

| | | | |
|---|---|---|---|
| 4,176,222 A | 11/1979 | Cinderey et al. | |
| 4,380,618 A | 4/1983 | Khan et al. | |
| 5,131,827 A | 7/1992 | Tasaka | |
| 6,013,719 A * | 1/2000 | Lahijani | C08L 27/18 |
| | | | 524/502 |
| 6,177,518 B1 | 1/2001 | Lahijani | |
| 6,265,492 B1 | 7/2001 | Lahijani | |
| 6,566,484 B2 | 5/2003 | Gharda et al. | |
| 7,056,589 B2 | 6/2006 | Haupert et al. | |
| 7,056,590 B2 | 6/2006 | Bickle et al. | |
| 2003/0109646 A1 | 6/2003 | Kubo et al. | |

(Continued)

FOREIGN PATENT DOCUMENTS

| | | |
|---|---|---|
| CA | 847963 A | 7/1970 |
| EP | 1454963 A1 | 9/2004 |
| GB | 2344624 A | 6/2000 |
| JP | 58160346 A | 9/1983 |
| JP | 61162549 A | 7/1986 |
| JP | 9157532 A | 6/1997 |

OTHER PUBLICATIONS

Tuminello W.H. et al., "Poly(tetrafluoroethylene): molecular weight distributions and chain stiffness", Macromolecules, 1988, vol. 21, pp. 2606-2610—American Chemical Society.

(Continued)

*Primary Examiner* — Ling Siu Choi
*Assistant Examiner* — Ronald Grinsted

(57) ABSTRACT

A composition [composition (C)] comprising: —from 0.1 to 99.8% by weight (wt. %) of at least one poly(aryl ether ketone) polymer having a melt flow rate (MFR) equal to or higher than 8 g/10 min at 400° C. and under a load of 2.16 kg, as measured in accordance with ASTM method D1238 [(PAEK$_{HMF}$) polymer], —from 0.1 to 30 wt. % of at least one poly(tetrafluoroethylene)polymer having a D50 particle size equal to or below 10 μm, and having a melting temperature equal to or below 324° C. [(PTFE) polymer], —and from 0.1 to 30% wt. % of at least one carbon fiber, and wherein all % are based on the total weight of the composition (C).

18 Claims, No Drawings

(56) References Cited

U.S. PATENT DOCUMENTS

| | | | |
|---|---|---|---|
| 2003/0130476 A1 | 7/2003 | Kemmish et al. | |
| 2006/0251878 A1* | 11/2006 | Meakin | C08G 65/40 428/292.1 |
| 2009/0003740 A1 | 1/2009 | Schubert et al. | |
| 2010/0144955 A1* | 6/2010 | El-Hibri | C08G 75/23 524/514 |
| 2011/0218311 A1 | 9/2011 | Smith et al. | |
| 2011/0262059 A1 | 10/2011 | Karaki et al. | |

OTHER PUBLICATIONS

Gangal S.V., "Polytetrafluoroethylene", Kirk-Othmer Encyclopedia of Chemical Technology, 1994, 4th Edition, vol. 11, p. 637-639, John Wiley and Sons.

Standard ASTM D1238-2004, "Standard Test Method for Melt Flow Rates of Thermoplastics by Extrusion Plastometer", 2004, p. 1-13.

Zhang G. et al., "Friction and wear variations of short carbon fiber (SCF)/PTFE/graphite (10vol.%) filled PEEK: Effects of fiber orientation and nominal contact pressure", WEAR, Mar. 9, 2010 (Mar. 9, 2010), vol. 268, No. 7-8, pp. 893-899—Elsevier Sequoia, Lausanne, CH—XP026924017, ISSN: 0043-1648, DOI: 10.1016/J.WEAR. 2009.12.001 [retrieved on Jan. 6, 2010].

Burris D. L. et al., "A low friction and ultra low wear rate PEEK/PTFE composite", WEAR, Aug. 30, 2006 (Aug. 30, 2006), vol. 261, No. 3-4, pp. 410-418—Elsevier Sequoia, Lausanne, CH—XP027902692, ISSN: 0043-1648 [retrieved on Aug. 30, 2006].

Bijwe J. et al., "Influence of PTFE content in PEEK-PTFE blends on mechanical properties and tribo-performance in various wear modes", WEAR, May 1, 2005 (May 1, 2005), vol. 258, No. 10, pp. 1536-1542—, Elsevier Sequoia, Lausanne, CH—XP027614408, ISSN: 0043-1646 [retrieved on May 1, 2005].

Oster F. et al., "New polyetheretherketone-based coatings for severe tribological applications", Materialwissenschaft und Werkstofftechnik (2004), 35(10-11), 690-695.

Anonymous, "High-Flow PEEK is new for thin-wall parts", Plastics Technology, Aug. 2005, vol. 51(8), p. 31.

\* cited by examiner

HIGH MELT FLOW PAEK COMPOSITIONS

This application claims priority to U.S. provisional application No. 61/696,546 filed on 4 Sep. 2012 and to European application No. 12194429.2 filed on 27 Nov. 2012, the whole content of each of these applications being incorporated herein by reference for all purposes.

FIELD OF INVENTION

The present invention relates to a poly(aryletherketone) (PAEK)-based polymer composition having improved tribological properties, in particular improved friction and wear performance. The invention further relates to a process for its manufacture and to its use for the manufacture of tribological articles.

BACKGROUND OF THE INVENTION

Thermoplastics are increasingly displacing metals in many tribological materials such as radial and axial bearings, engines, gears, seals rings, which are used in many automotive and industrial applications, especially for example in automobiles having 7 to 8 gears, which require materials having the strength and wear resistance found in lubricated metals. Internally lubricated polymers are replacing metals in these applications because of their ease of fabrication, higher performance, lower or little dependence on external lubrication, and lower overall cost.

PAEK polymers, including in particular poly(etheretherketone) (PEEK), poly(etherketone) (PEK) and poly(etherketoneketone) (PEKK) polymers are well known for their exceptional balance of technical properties, namely having excellent heat resistance, mechanical properties and wear resistance. However, when PAEK is used alone, the coefficient of friction is high, so that a resin having a low coefficient of friction such as notably polytetrafluoroethylene polymers (PTFE) or the like is added to the PAEK polymer to lower the coefficient of friction thereof.

PTFE polymers, while known for their thermal stability, high melting temperature, chemical inertness and lubricity and in particular having a low coefficient of friction, it is also known that their addition results in deterioration of mechanical strength. GB 3 344 624 A patent application discloses a PEEK/PTFE resin layer which is bonded to a backing metal to form a composite bearing. It has been stated that due to the fact that the PTFE particles, present in an amount of 0.1 to 50% by weight, and having a molecular weight of 300,000 to 500,000 could be dispersed in the form of particles in PEEK based resin that the resulting PEEK/PTFE resin layer has greater peeling strength and the bonding force between the backing metal and said resin layer is greater than similar resins with PTFE particles of lower weight.

However it is generally known that carbon fibers (CF) are often added to PAEK/PTFE compositions to improve their mechanical strength and wear resistance such as notably described in JP-A 58-160,346.

JP-A 58-160,346 discloses a PAEK/PTFE/CF resin composition which has outstanding sliding characteristics and comprises a thermoplastic aromatic polyetherketone such as PEEK, as a base material, 10 to 40% by weight of polytetrafluoroethylene which has a mean particle size of less than 20 µm as a fluorocarbon polymer and 10 to 40% by weight of a carbon fiber. It is stated that a high heat distortion temperature (HDT) and a high limiting PV (a product of pressure and velocity) value are obtained by the above resin composition. The thermoplastic aromatic poly(ether ketone) can have an intrinsic viscosity (IV) of between 0.7 and 2.6 (dL/g), measured at 25° C. on a solution of 0.1 g of polymer in 100 ml $H_2SO_4$ with a density of 1.84 $g/cm^3$.

This said, it is thus widely recognized that compositions in which PAEK polymers are used as base resin and thereto has added polytetrafluoroethylene polymers and carbon fibers, and the like are used for friction and wear applications. However, it should be said that the limiting PV value is still a medium value thereby restricting its applicability in for example new transmission designs/applications that require the highest friction and wear performance.

There is thus a continuous need for new PAEK/PTFE/CF compositions having improved friction and wear capabilities but also possessing a combination of high performance properties including high mechanical strength, high temperature performance, chemical resistance, and moreover offering superior processability capabilities.

SUMMARY OF INVENTION

The Applicant has now found surprisingly that it is possible to provide PAEK/PTFE/CF compositions advantageously fulfilling the above mentioned needs.

The invention thus pertains to a composition [composition (C)] comprising:

from 0.1 to 99.8% by weight (wt. %) of at least one poly(aryl ether ketone) polymer having a melt flow rate (MFR) equal to or higher than 8 g/10 min at 400° C. and under a load of 2.16 kg, as measured in accordance with ASTM method D1238 [($PAEK_{HMF}$) polymer, herein after], from 0.1 to 30 wt. % of at least one poly(tetrafluoroethylene) polymer having a D50 particle size equal to or below 10 µm, and having a melting temperature equal to or below 324° C. [(PTFE) polymer, herein after], and from 0.1 to 30% wt. % of at least one carbon fiber, and wherein all % are based on the total weight of the composition (C).

In the rest of the text, the expression "($PAEK_{HMF}$) polymer" is understood, for the purposes of the present invention, both in the plural and the singular, that is to say that the inventive composition may comprise one or more than one ($PAEK_{HMF}$) polymer. It is understood that the same applies for the expressions "(PTFE) polymer" and the "carbon fiber".

For the purpose of the invention, the expressions "poly (aryl ether ketone) polymer having a melt flow rate (MFR) equal to or higher than 8 g/10 min at 400° C. and under a load of 2.16 kg, as measured in accordance with ASTM method D1238" and "($PAEK_{HMF}$) polymer" are intended to denote any polymer, comprising recurring units, more than 50% moles of said recurring units are recurring units ($R_{PAEK\_HMF}$) comprising a Ar—C(O)—Ar' group, with Ar and Ar', equal to or different from each other, being aromatic groups. The recurring units ($R_{PAEK\_HMF}$) are generally selected from the group consisting of formulae (J-A) to (J-O), herein below:

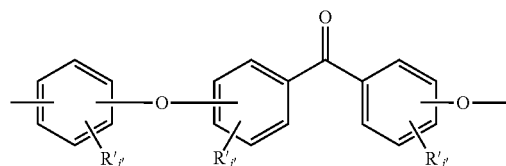
(J-A)
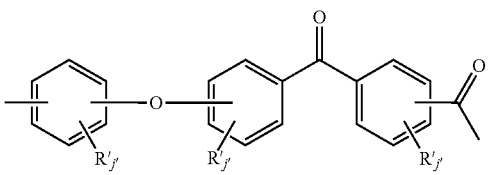
(J-B)
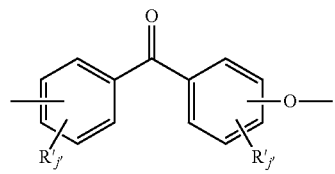
(J-C)
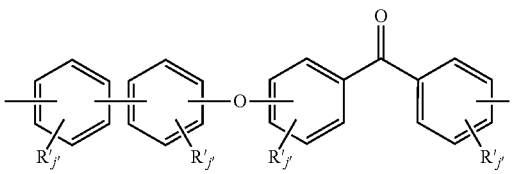
(J-D)
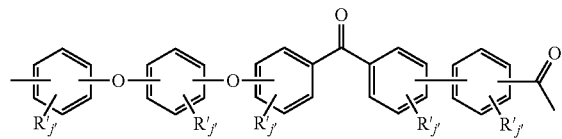
(J-E)
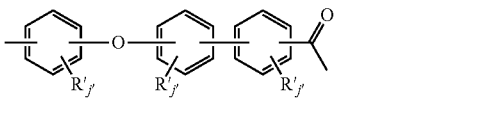
(J-F)
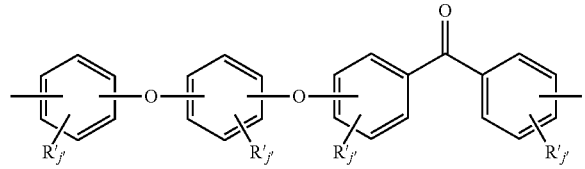
(J-G)
(J-H)
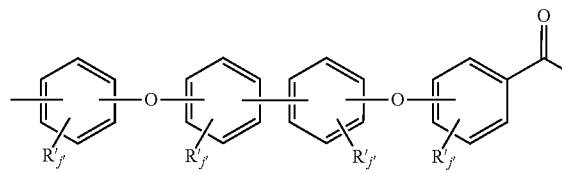
(J-I)
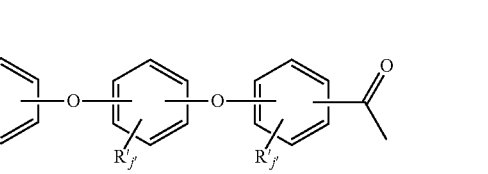
(J-J)
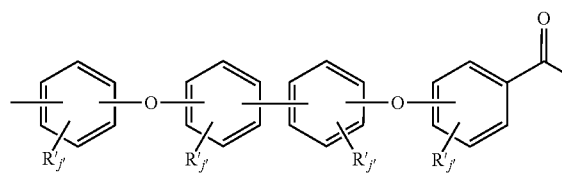
(J-K)
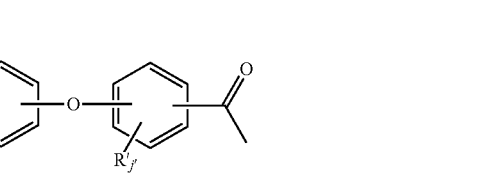
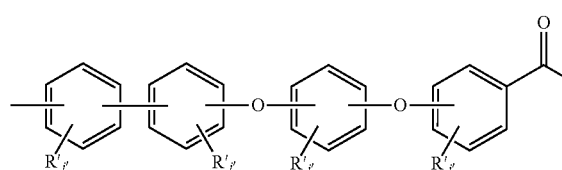
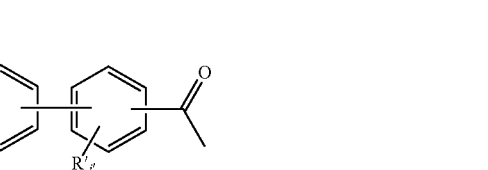
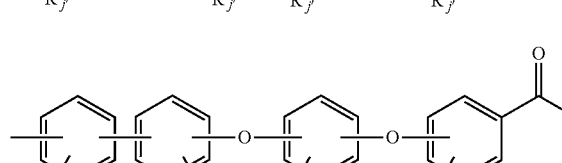
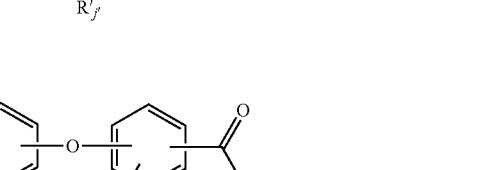
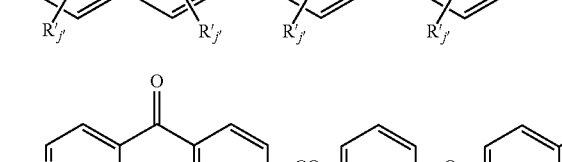
(J-L)

(J-M) 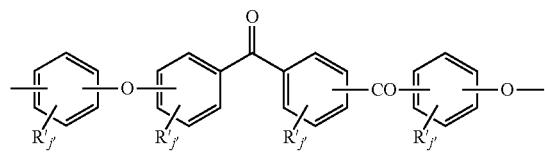

(J-N) 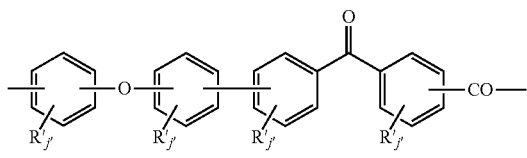

(J-O) 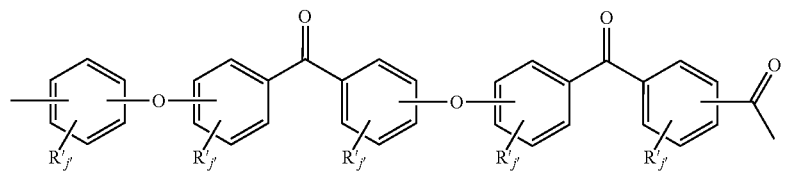

wherein:
  each of R', equal to or different from each other, is selected from the group consisting of halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium;
  j' is zero or is an integer from 0 to 4.

In recurring unit ($R_{PAEK\_HMF}$), the respective phenylene moieties may independently have 1,2-, 1,4- or 1,3-linkages to the other moieties different from R' in the recurring unit. Preferably, said phenylene moieties have 1,3- or 1,4-linkages, more preferably they have 1,4-linkage.

Still, in recurring units ($R_{PAEK\_HMF}$), j' is preferably at each occurrence zero, that is to say that the phenylene moieties have no other substituents than those enabling linkage in the main chain of the polymer.

Preferred recurring units ($R_{PAEK\_HMF}$) are thus selected from those of formulae (J'-A) to (J'-O) herein below:

(J'-A) 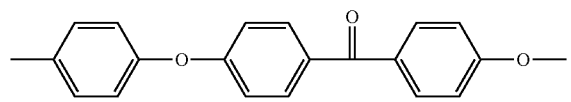

(J'-B) 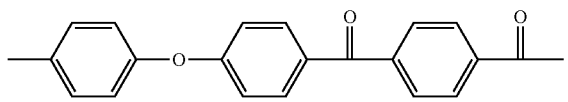

(J'-C) 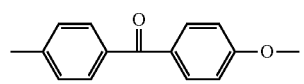

(J'-D) 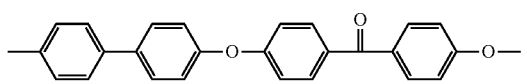

(J'-E) 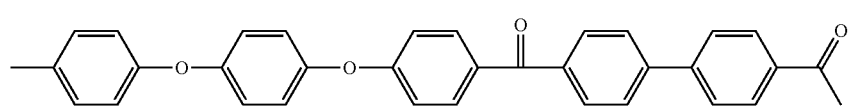

(J'-F) 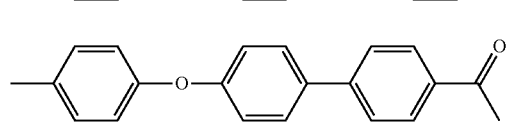

(J'-G) 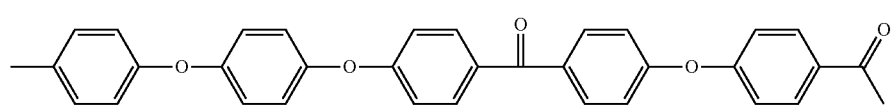

(J'-H) 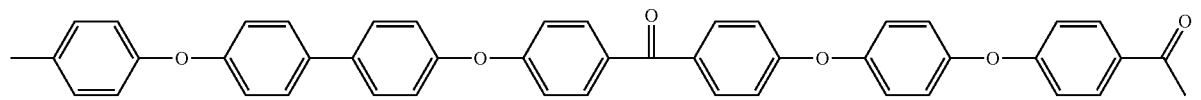

(J'-I) 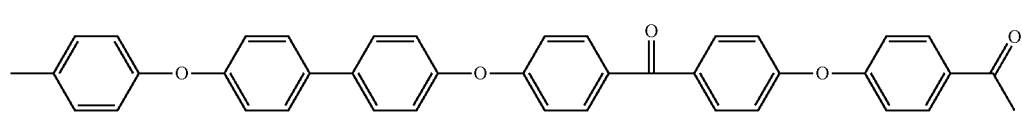

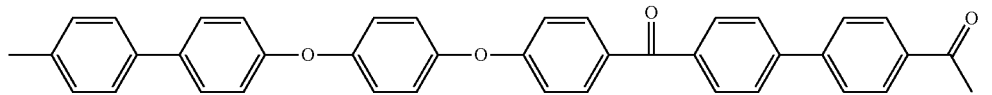
(J'-J)

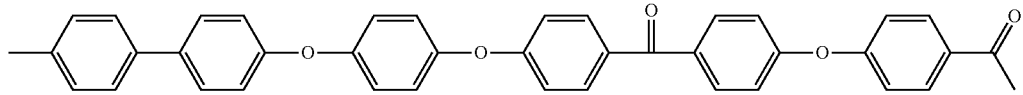
(J'-K)

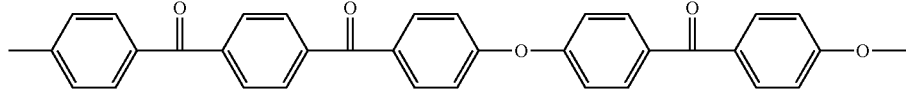
(J'-L)

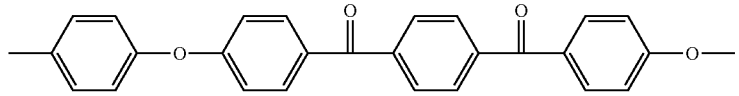
(J'-M)

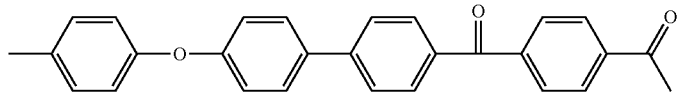
(J'-N)

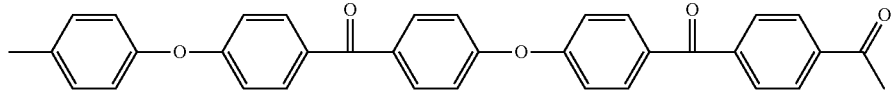
(J'-O)

Still more preferably, ($R_{PAEK\_HMF}$) are chosen from:

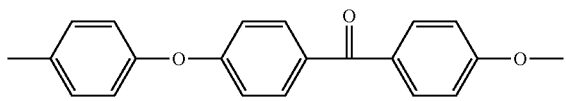
(J'-A)

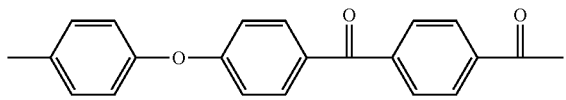
(J'-B)

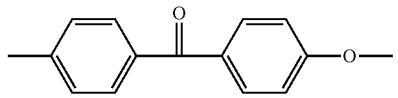
(J'-C)

In the ($PAEK_{HMF}$) polymer, as detailed above, preferably more than 60 wt. %, more preferably more than 80 wt. %, still more preferably more than 90 wt. % of the recurring units are recurring units ($R_{PAEK\_HMF}$), as above detailed. Still, it is generally preferred that substantially all recurring units of the ($PAEK_{HMF}$) polymer are recurring units ($R_{PAEK\_HMF}$), as detailed above; chain defects, or very minor amounts of other units might be present, being understood that these latter do not substantially modify the properties of ($R_{PAEK\_HMF}$).

The ($PAEK_{HMF}$) polymer may be notably a homopolymer, a random, alternate or block copolymer. When the ($PAEK_{HMF}$) polymer is a copolymer, it may notably contain (i) recurring units ($R_{PAEK\_HMF}$) of at least two different formulae chosen from formulae (J-A) to (J-O), or (ii) recurring units ($R_{PAEK\_HMF}$) of one or more formulae (J-A) to (J-O) and recurring units ($R^*P_{PAEK\_HMF}$) different from recurring units ($R_{PAEK\_HMF}$).

As will be detailed later on, the ($PAEK_{HMF}$) polymer may be a polyetheretherketones polymer [($PEEK_{HMF}$) polymer, herein after]. Alternatively, the ($PAEK_{HMF}$) polymer may be a polyetherketoneketone polymer [($PEKK_{HMF}$) polymer, herein after], a polyetherketone polymer [($PEK_{HMF}$) polymer, herein after] or a polyetheretherketone-polyetherketoneketone polymer [($PEEK_{HMF}$-$PEK_{HMF}$) polymer, herein after].

The ($PAEK_{HMF}$) polymer may also be a blend composed of at least two different ($PAEK_{HMF}$) polymers selected from the group consisting of ($PEEK_{HMF}$) polymers, ($PEEK_{HMF}$) polymers, ($PEK_{HMF}$) polymers, and ($PEEK_{HMF}$-$PEK_{HMF}$) polymers.

For the purpose of the present invention, the term "($PEEK_{HMF}$) polymer" is intended to denote any polymer of which more than 50 wt. % of the recurring units are recurring units ($R_{PAEK\_HMF}$) of formula J'-A. Preferably more than 75 wt. %, preferably more than 85 wt. %, preferably more than 95 wt. %, preferably more than 99 wt. % of the recurring units of the ($PEEK_{HMF}$) polymer are recurring units of formula J'-A. Most preferably all the recurring units of the ($PEEK_{HMF}$) polymer are recurring units of formula J'-A.

For the purpose of the present invention, the term "($PEEK_{HMF}$) polymer" is intended to denote any polymer of which more than 50 wt. % of the recurring units are recurring units ($R_{PAEK\_HMF}$) of formula J'-B. Preferably more than 75 wt. %, preferably more than 85 wt. %, preferably more than 95 wt. %, preferably more than 99 wt. % of the recurring units of the ($PEEK_{HMF}$) polymer are recurring units of formula J'-B. Most preferably all the recurring units of the ($PEEK_{HMF}$) polymer are recurring units of formula J'-B.

For the purpose of the present invention, the term "($PEK_{HMF}$) polymer" is intended to denote any polymer of which more than 50 wt. % of the recurring units are recurring units ($R_{PAEK\_HMF}$) of formula J'-C.

Preferably more than 75 wt. %, preferably more than 85 wt. %, preferably more than 95 wt. %, preferably more than 99 wt. % of the recurring units of the (PEK$_{HMF}$) polymer are recurring units of formula J'-C. Most preferably all the recurring units of the (PEK$_{HMF}$) polymer are recurring units of formula J'-C.

Excellent results were obtained when the polymer (PAEK$_{HMF}$) was a (PEEK$_{HMF}$) homopolymer, i.e. a polymer of which substantially all the recurring units of the (PEEK$_{HMF}$) polymer are recurring units of formula J'-A, chain defects, or very minor amounts of other units might be present, being understood that these latter do not substantially modify the properties of the (PEEK$_{HMF}$) homopolymer.

It is essential that the (PAEK$_{HMF}$) polymer has a melt flow rate (MFR) equal to or higher than 8 g/10 min at 400° C. and under a load of 2.16 kg, as measured in accordance with ASTM method D1238, preferably MFR is equal to or higher than 15 g/10 min, preferably MFR is equal to or higher than 20 g/10 min, more preferably MFR is equal to or higher than 30 g/10 min, even more preferably MFR is equal to or higher than 34 g/10 min, most preferably MFR is equal to or higher than 38 g/10 min.

The melt flow rate (MFR) of the (PAEK$_{HMF}$) polymer at 400° C. and under a load of 2.16 kg, as measured in accordance with ASTM method D1238, is generally of at most 120 g/10 min, preferably of at most 80 g/10 min, preferably of at most 60 g/10 min, more preferably of at most 55 g/10 min, and still more preferably of at most 45 g/10 min.

Excellent results have been obtained with (PAEK$_{HMF}$) polymers having a melt flow rate (MFR) at 400° C. and under a load of 2.16 kg, as measured in accordance with ASTM method D1238 from 38 g/10 min to 45 g/10 min.

In general a Tinius Olsen Extrusion Plastometer melt flow test apparatus can be used to measure said melt flow rate.

The (PAEK$_{HMF}$) polymer can have a reduced viscosity (RV) of at least 0.50 dl/g, preferably at least 0.65 dl/g, more preferably at least 0.70 dl/g, even more preferably at least 0.80 dl/g as measured in 95-98% sulfuric acid (d=1.84 g/ml) at a (PAEK$_{HMF}$) polymer concentration of 1 g/100 ml.

The RV of the (PAEK$_{HMF}$) polymer can notably be equal to or less than 1.20 dl/g preferably equal to or less than 1.10 dl/g, more preferably equal to or less than 1.00 dl/g, more preferably equal to or less than 0.90 dl/g, most preferably equal to or less than 0.85 dl/g, as measured in 95-98% sulfuric acid (d=1.84 g/ml) at a (PAEK$_{HMF}$) polymer concentration of 1 g/100 ml.

Good results have been obtained with (PAEK$_{HMF}$) polymers having a RV from 0.70 dl/g to 0.90 dl/g, as measured in 95-98% sulfuric acid (d=1.84 g/ml) at a (PAEK$_{HMF}$) polymer concentration of 1 g/100 ml. Excellent results have been obtained with (PAEK$_{HMF}$) polymers having a RV from 0.80 dl/g to 0.85 dl/g, as measured in 95-98% sulfuric acid (d=1.84 g/ml) at a (PAEK$_{HMF}$) polymer concentration of 1 g/100 ml.

The measurement is generally performed using a No 50 Cannon-Fleske viscometer; RV is measured at 25° C. in a time less than 4 hours after dissolution.

The (PAEK$_{HMF}$) polymer can have a intrinsic viscosity (IV) of at least 0.50 dl/g, preferably at least 0.60 dl/g, more preferably at least 0.70 dl/g, as measured in 95-98% sulfuric acid (d=1.84 g/ml) at a (PAEK$_{HMF}$) polymer concentration of 0.1 g/100 ml.

The IV of the (PAEK$_{HMF}$) polymer can notably be equal to or less than 1.10 dl/g, preferably equal to or less than 0.90 dl/g, more preferably equal to or less than 0.85 dl/g, most preferably equal to or less than 0.80 dl/g, as measured in 95-98% sulfuric acid (d=1.84 g/ml) at a (PAEK$_{HMF}$) polymer concentration of 0.1 g/100 ml.

Good results have been obtained with (PAEK$_{HMF}$) polymers having an IV from 0.70 dl/g to 0.80 dl/g, as measured in 95-98% sulfuric acid (d=1.84 g/ml) at a (PAEK$_{HMF}$) polymer concentration of 0.1 g/100 ml.

The measurement is generally performed using a No 50 Cannon-Fleske viscometer; IV is measured at 25° C. in a time less than 4 hours after dissolution.

The (PAEK$_{HMF}$) polymer has a melt viscosity of advantageously at least 0.05 kPa·s, preferably at least 0.08 kPa·s, more preferably at least 0.1 kPa·s, still more preferably at least 0.15 kPa·s at 400° C. and a shear rate of 1000 s$^{-1}$, as measured using a capillary rheometer in accordance with ASTM D3835. As capillary rheometer, a Kayeness Galaxy V Rheometer (Model 8052 DM) can be used.

The (PAEK$_{HMF}$) polymer has a melt viscosity of advantageously at most 0.35 kPa·s, preferably at most 0.40 kPa·s, more preferably at most 0.42 kPa·s at 400° C. and a shear rate of 1000 s$^{-1}$, as measured using a capillary rheometer in accordance with ASTM D3835.

Non limitative examples of commercially available (PAEK) polymers suitable for the invention include the KETASPIRE® polyetheretherketone commercially available from Solvay Specialty Polymers USA, LLC.

The (PAEK$_{HMF}$) polymer can be prepared by any method known in the art for the manufacture of poly(aryl ether ketone)s.

One well known in the art process to produce poly(aryl ether ketone)s, in particular PEEK homopolymers, comprises the step of reacting a usually substantially equimolar mixture of at least one bisphenol with at least one dihalobenzoid compound, and/or at least one halophenol compound (nucleophilic polycondensation reaction), as described in Canadian Pat. No. 847,963 and U.S. Pat. No. 4,176,222, the whole content of both being herein incorporated by reference. A preferred bisphenol in such a process is hydroquinone; preferred dihalobenzoid compounds in such a process are 4,4'-difluorobenzophenone, 4,4'-dichlorobenzophenone and 4-chloro-4'-fluorobenzophenone; preferred halophenols compounds in such a process are 4-(4-chlorobenzoyl)phenol and 4-(4-fluorobenzoyl)phenol.

Another well known in the art process to produce PEEK homopolymers comprises the step of electrophilically polymerizing phenoxyphenoxybenzoic acid or the like, using an alkane sulfonic acid as solvent and in the presence of a condensing agent, as the process described in U.S. Pat. No. 6,566,484, the whole content of which is herein incorporated by reference. Other poly(aryl ether ketone)s may be produced by the same method, starting from other monomers than phenoxyphenoxybenzoic acid, such as those described in U.S. Pat. Appl. 2003/0130476, the whole content of which is also herein incorporated by reference.

Polyetheretherketone homopolymers are commercially available notably from Solvay Advanced Polymers, L.L.C. as KETASPIRE® and GATONE® poly(aryl ether ketone)s.

The weight percent of the (PAEK$_{HMF}$) polymer in the composition (C) is generally of at least 10 wt. %, preferably of at least 20 wt. %, preferably of at least 30 wt. %, preferably of at least 40 wt. %, more preferably of at least 55 wt. %, based on the total weight of the composition (C).

It is further understood that the weight percent of the (PAEK$_{HMF}$) polymer in the composition (C) will generally be of at most 99.8 wt. %, preferably of at most 95 wt. %, more preferably of at most 90 wt. %, more preferably of at most 80 wt. %, more preferably of at most 75 wt. %, based on the total weight of the composition (C).

Excellent results were obtained when the composition (C) comprised the (PAEK$_{HMF}$) polymer in an amount from 40 to 80 wt. %, preferably from 55 to 75 wt. %, based on the total weight of the composition (C).

Poly(tetrafluoroethylene) Polymer

As said, composition (C) comprises at least one (PTFE) polymer having a D50 particle size equal to or below 10 µm, and having a melting temperature equal to or below 324° C.

The Applicant has surprisingly found that combining the (PTFE) polymers having above recited properties with the (PAEK$_{HMF}$) polymers, as detailed above, are effective in providing compositions possessing an increased melt flow rate thereby enhancing their processability and as well their flexural and tensile modulus.

The (PTFE) polymers suitable for being used in the composition (C) generally are polymers of tetrafluoroethylene. Within the scope of the present invention, it is understood, however, that the (PTFE) polymer may also comprise minor amounts of one or more co-monomers such as hexafluoropropylene, perfluoro(methyl vinyl ether), perfluoro(propyl vinyl ether), perfluoro-(2,2-dimethyl-1,3-dioxole), and the like, provided, however that the latter do not significantly adversely affect the unique properties, such as thermal and chemical stability of the tetrafluoroethylene homopolymer. Preferably, the amount of such co-monomer does not exceed about 3 mole percent (herein "mol %'), and more preferably less than about 1 mol %; particularly preferred is a co-monomer content of less than 0.5 mol %. In the case that the overall co-monomer content is greater than 0.5 mol %, it is preferred that amount of the a perfluoro(alkyl vinylether) co-monomer is less than about 0.5 mol %. Most preferred are (PTFE) homopolymers.

The Applicant has found that the D50 particle size of the (PTFE) polymer of the composition (C) is of great importance.

As said, the D50 particle size of the (PTFE) polymer of the composition (C) is advantageously equal to or below 10 µm, preferably equal to or below 8 µm, more preferably equal to or below 7 µm.

The D50 particle size value of the (PTFE) polymer of the composition (C) is preferably equal to or at least 0.05 µm, equal to or at least 0.1 µm, more preferably equal to or at least 0.2 µm, equal to or at least 1 µm, more preferably equal to or at least 2 µm, most preferably equal to or at least 3 µm.

The D50 particle size value of the (PTFE) polymer of the composition (C) is advantageously from 2 µm to 8 µm, preferably from 3 µm to 7 µm.

A D50 particle size value of the (PTFE) polymer of the composition (C) of 6 µm gave particularly good results.

For the purpose of the present invention, the D50 value of the particle size means a particle size, such as 50 weight percent of the relevant material have a larger particle size and 50 weight percent have a smaller particle size.

The D50 value of the particle size of the (PTFE) polymer is measured via light scattering techniques (dynamic or laser) using the respective equipment coming for example from the company Malvern (Mastersizer Micro or 3000) or using screen analysis according to DIN 53196.

For the purpose of the present invention, it is the second melting temperature of the (PTFE) polymer of the present invention which can be measured according to a modified ASTM D3418 method, as specified below. It is understood that the melting point recorded at the second heating period is hereby referred to as the melting point of the (PTFE) polymer of the present invention (T$_{mII}$).

The (PTFE) polymer of the present invention has advantageously a melting temperature (T$_{mII}$) equal to or below 324° C., more preferably equal to or below 323° C., even more preferably equal to or below 322° C.

While lower boundary or the melting temperature (T$_{mII}$) of the (PTFE) polymer is not critical, it is nevertheless generally understood that (PTFE) polymers suitable for being used in this invention generally possess a melting temperature (T$_{mII}$) of at least 320° C.

Good results were obtained with (PTFE) polymers having a melting temperature of 320° C. to 323° C.

The (PTFE) polymer of the present invention has advantageously a melt viscosity (MV) from 50 to $1 \times 10^5$ Pa·s at 372° C. measured in accordance with the procedure of ASTM D-1238-52T modified as notably described in U.S. Pat. No. 4,380,618, the whole contents of which is herein incorporated by reference, preferably MV of the (PTFE) polymer is from 100 to $1 \times 10^4$ Pa·s at 372° C. in accordance with the procedure of the modified ASTM D-1238-52T as described above.

The (PTFE) polymer of the present invention is in general characterized by a melt flow rate (MFR) at 372° C. and under a load of 2.16 kg, as measured in accordance with ASTM method D1238, from about 0.10 g/10 min to about 200 g/10 min.

In a specific embodiment of the present invention, the melt flow rate (MFR) of the (PTFE) polymer is measured at 325° C. and under a load of 225 g, as measured in accordance with ASTM method D1238, and the MFR in general can vary from about 0.10 g/10 min to about 200 g/10 min.

The (PTFE) polymer of the composition (C) is a low molecular weight polymer, that is to say a polymer having a number averaged molecular weight (Mn) advantageously equal to or below 700000, preferably equal to or below 200000, preferably equal to or below 100000, preferably equal to or below 90000, more preferably equal to or below 50 000, more preferably equal to or below 20000.

The (PTFE) polymers of the present invention can be synthesized according to any standard chemical methods for the polymerization of tetrafluoroethylene as described in detail in the literature, such as notably by W. H. Tuminello et al., Macromolecules, Vol. 21, pp. 2606-2610 (1988); notably in Kirk-Othmer, The Encyclopedia of Chemical Technology, 4 th Ed., pub. by John Wiley and Sons (1994) on pp 637-639 of Vol. 11, notably in US 2011/0218311 A1 and as practiced in the art. These publications notably describe the low molecular weight tetrafluoroethylene polymers as being obtained by polymerization or by controlled degradation of common, high molecular weight PTFEs or low co-monomer content copolymers thereof, for example by controlled thermal decomposition, electron beam, gamma- or other radiation, and the like. Said so obtained low molecular weight PTFE are often described as PTFE micropowders.

The weight percent of the (PTFE) polymer in the composition (C) is generally of at least 0.1 wt. %, preferably of at least 5 wt. %, more preferably of at least 10 wt. %, more preferably of at least 12 wt. %, based on the total weight of the composition (C).

It is further understood that the weight percent of the (PTFE) polymer in the composition (C) will generally be of at most 40 wt. %, preferably of at most 30 wt. %, more preferably of at most 20 wt. %, more preferably of at most 18 wt. %, based on the total weight of the composition (C).

Excellent results were obtained when the composition (C) comprised the (PTFE) polymer in an amount from 12 to 18 wt. %, more preferably of about 15 wt. %, based on the total weight of the composition (C).

Composition (C) further comprises at least one carbon fiber.

For the purpose of the present invention, the term "carbon fiber" is intended to include graphitized, partially graphitized and ungraphitized carbon reinforcing fibers or a mixture thereof.

For the purpose of the present invention, the term "fiber" means a fundamental form of solid (often crystalline) characterized by relative high tenacity and an high ratio of length to diameter.

The term "graphitized" intends to denote carbon fibers obtained by high temperature pyrolysis (over 2000° C.) of carbon fibers, wherein the carbon atoms place in a way similar to the graphite structure.

Carbon fibers useful for the present invention can advantageously be obtained by heat treatment and pyrolysis of different polymer precursors such as, for example, rayon, polyacrylonitrile (PAN), aromatic polyamide or phenolic resin; carbon fibers useful for the present invention may also be obtained from pitchy materials.

Carbon fibers useful for the present invention are preferably chosen from the group composed of PAN-based carbon fibers (PAN-CF), pitch based carbon fibers, graphitized pitch-based carbon fibers, and mixtures thereof. More preferably, the carbon fibers are chosen from PAN-based carbon fibers and graphitized pitch-based carbon fibers. PAN-based carbon fibers (PAN-CF) are most preferred.

PAN-based carbon fibers (PAN-CF) have advantageously a diameter of between 5 to 20 μm, preferably from 7 to 15 μm, more preferably from 8 to 12 μm, most preferably from 6 to 8 μm. Good results were obtained with PAN-based carbon fibers (PAN-CF) having a diameter of 7 μm.

The PAN-CF maybe of any length. In general, the length of PAN-CF is at least 50 μm.

The PAN-CF has advantageously a length from 1 μm to 1 cm, preferably from 1 μm to 1 mm, more preferably from 5 μm to 500 μm and still more preferably from 50 to 150 μm.

The PAN-CF has advantageously a length to diameter ratio of at least 2, preferably of at least 5, more preferably of at least 7.

The PAN-CF has advantageously a length to diameter ratio of 2 to 30, preferably a ratio of 5 to 25, more preferably a ratio of 7 to 20. Good results were obtained with PAN-based carbon fibers (PAN-CF) having a ratio of 14.

Graphitized pitch-based carbon fibers are readily available from commercial sources containing at least about 50% weight graphitic carbon, greater than about 75% weight graphitic carbon, and up to substantially 100% graphitic carbon. Highly graphitic carbon fiber particularly suitable for use in the practice of this invention may be further characterized as highly conductive, and such fiber is generally used having a modulus of about 80 to about 120 million pounds per square inch, i.e., million lbs/in$^2$ (MSI). In certain embodiments the highly graphitic carbon fiber has a modulus of about 85 to about 120 MSI, and in other certain embodiments about 100 to about 115 MSI.

The pitch-based-CF has advantageously a diameter between 5 to 20 μm, preferably from 7 to 15 μm, more preferably from 8 to 12 μm.

The pitch-based-CF maybe of any length. The pitch-based-CF has advantageously a length from 1 μm to 1 cm, preferably from 1 μm to 1 mm, more preferably from 5 μm to 500 μm and still more preferably from 50 to 150 μm.

The pitch-based-CF has advantageously a length to diameter ratio of at least 0.1, preferably of at least 3.0, more preferably of at least 10.0.

The pitch-based-CF has advantageously a length to diameter ratio of 0.1 to 30.0, preferably a ratio of 3 to 20, more preferably a ratio of 10 to 15. Carbon fiber may be employed as chopped carbon fiber or in a particulate form such as may be obtained by chopping or comminuting the fiber. Comminuted graphitized pitch-based carbon fiber suitable for use in the practice of the invention may be obtained from commercial sources including from Cytec Carbon Fibers as ThermalGraph DKD X and CKD X grades of pitch-based carbon fiber and Mitsubishi Carbon Fibers as Dialead carbon fibers. Chopped PAN-based carbon fibers preferably used in the present invention may be obtained from commercial sources.

The composition (C) of the present invention advantageously comprises the carbon fiber in an amount of at least 0.5 wt. %, preferably at least 5.0 wt. %, more preferably at least 10.0 wt. %, based on the total weight of the composition (C).

The composition (C) of the present invention advantageously comprises the carbon fiber in an amount of at most 30 wt. %, preferably at most 25 wt. % volume, more preferably at most 20 wt. %, based on the total weight of the composition (C).

Compositions comprising the carbon fiber in an amount from 10 to 20 wt. %, based on the total weight of the composition (C), gave particularly good results. Excellent results were obtained with the carbon fiber in an amount of a 15 wt. %, based on the total weight of the composition (C).

Other Optional Ingredients

Optionally, the composition (C) of the invention can further comprise one or more ingredients (I) such as for example, additives that improve certain of properties of the polymer composition, notably: short term mechanical capabilities (i.e. mechanical strength, toughness, hardness, stiffness), thermal conductivity, creep strength and fracture resistance, high temperature dimensional stability, fatigue resistance and the like. Non limiting examples of said other ingredients (I) may notably include glass fibers; glass beads; asbestos fibers; boron fibers (e.g. obtained by deposition of boron microgranules on a tungsten or carbonate yarn), metal fibers; ceramic fibers like silicon nitride Si3N4; talc-glass fibers; calcium silicate fibers like wollastonite micro-fibers; silicon carbide fibers; boron nitride, graphene, carbon nanotubes (CNT), metal borides fibers (e.g. TiB2) titanium dioxide and mixtures thereof.

When one or more optional ingredients are present, their total weight, based on the total weight of polymer composition (C), is usually below 50%, preferably below 20%, more preferably below 10% and even more preferably below 5%.

The composition (C) of the invention is preferably consisting essentially of the (PAEK$_{HMF}$) polymer, as described above, the (PTFE) polymer, as described above, the carbon fiber, as described above, and optionally, other ingredients (I), as described above.

For the purpose of the present invention, the expression "consisting essentially of" are intended to denote that any additional ingredient different from the (PAEK$_{HMF}$) polymer, as described above, the (PTFE) polymer, as described above, the carbon fiber, as described above, and optionally, other ingredients (I), as described above, is present in an amount of at most 1% by weight, based on the total weight of the composition (C).

In one preferred embodiment, the composition (C) of the invention comprises:
- from 55 to 75 wt. % of at least one ($PEEK_{HMF}$) polymer, as detailed above, having a melt flow rate (MFR) from 38 g/10 min to 45 g/10 min at 400° C. and under a load of 2.16 kg, as measured in accordance with ASTM method D1238,
- from 12 to 18 wt. % of at least one (PTFE) polymer, as detailed above, having a D50 particle size from 3 µm to 6 µm, and having a melting temperature of 320° C. to 323° C.
- from 10 to 20% wt. % of a carbon fiber, as detailed above, and wherein all % are based on the total weight of the composition (C).

The composition (C) of the present invention has advantageously a melt flow rate (MFR) equal to or higher than 50 g/10 min at 400° C. and under a load of 5 kg, as measured in accordance with ASTM method D1238, preferably MFR is equal to or higher than 55 g/10 min, more preferably MFR is equal to or higher than 60 g/10 min, even more preferably MFR is equal to or higher than 62 g/10 min.

The melt flow rate (MFR) of the composition (C) at 400° C. and under a load of 5 kg, as measured in accordance with ASTM method D1238, is generally of at most 120 g/10 min, preferably of at most 100 g/10 min, preferably of at most 80 g/10 min, more preferably of at most 75 g/10 min, still more preferably of at most 70 g/10 min, even still more preferably of at most 66 g/10 min.

Good results have been obtained with a composition (C) having a melt flow rate (MFR) at 400° C. and under a load of 5 kg, as measured in accordance with ASTM method D1238 from 50 g/10 min to 70 g/10 min. Excellent results have been obtained with a composition (C) having a melt flow rate (MFR) at 400° C. and under a load of 5 kg, as measured in accordance with ASTM method D1238 from 62 g/10 min to 66 g/10 min.

Another aspect of the present invention concerns a process for manufacturing the polymer composition (C) as above described, which comprises mixing:
- at least one ($PAEK_{HMF}$) polymer, as detailed above;
- at least one (PTFE) polymer, as detailed above;
- at least one carbon fiber, as detailed above; and
- optionally, at least one optional other ingredient (I), as detailed above.

Advantageously, the process of the invention comprises mixing by dry blending and/or melt compounding the ($PAEK_{HMF}$) polymer, as described above, in particular the ($PEEK_{HMF}$), polymer as described above, the (PTFE) polymer, as described above, the carbon fiber, as described above, and optionally, other ingredients (I), as described above.

Preferably, the ($PEEK_{HMF}$) polymer, as described above, the (PTFE) polymer, as described above, the carbon fiber, as described above, and optionally, other ingredients (I), as described above are mixed by melt compounding.

Advantageously, the ($PAEK_{HMF}$) polymer, as described above, in particular the ($PEEK_{HMF}$) polymer, as described above, the (PTFE) polymer, as described above, the carbon fiber, as described above, and optionally, other ingredients (I), are melt compounded in continuous or batch devices. Such devices are well-known to those skilled in the art.

Examples of suitable continuous devices to melt compound the polymer composition of the invention are notably screw extruders. Thus, the ($PAEK_{HMF}$) polymer as described above, in particular the ($PEEK_{HMF}$) polymer, as described above, the (PTFE) polymer, as described above, the carbon fiber, as described above, and optionally, other ingredients (I) are advantageously fed in powder or granular form in an extruder and the composition is extruded into strands and the strands are chopped into pellets.

In a most preferred embodiment, the ($PEEK_{HMF}$) polymer, as described above, the (PTFE) polymer, as described above, the carbon fiber, as described above, and optionally, other ingredients (I), are melt compounded in a twin-screw extruder.

The composition (C) can be further processed following standard methods for injection moulding, extrusion, blow moulding, foam processing, compression molding, casting, coating and the like. Finished articles comprising the composition (C) as described above can undergo post-fabrication operations such as post-curing.

Another object of the invention is an article comprising the composition (C) as described above.

The total weight of the composition (C), based on the total weight of the article, is advantageously above 50%, preferably above 80%; more preferably above 90%; more preferably above 95% and more preferably above 99%. If desired, the article may consist of the composition (C).

Advantageously, the article is an injection moulded article, an extrusion moulded article, a shaped article, a coated article or a casted article.

Non limiting examples of articles include notably bearing articles such as radial and axial bearings for auto transmission, bearings used in dampers, shock absorbers, bearings in any kind of pumps e.g. acid pumps; hydraulically actuated seal rings for clutch components; gears and the like.

In a particular embodiment, the article is a bearing article.

The bearing article can notably consist of several parts, wherein at least one of said parts, and possibly all of them, consists of the composition (C). When at least one part of a multi-part bearing article consists of a material other than the polymer composition (e.g. metal or steel) [hereinafter, the other part], the weight of said other part, based on the weight of the bearing article, is usually less than 50%, and is often less than 20%, or even less than 1% In accordance with the present invention, a certain preferred bearing article is a single part consisting of the composition (C). Another preferred bearing article consists of several parts consisting of the composition (C).

Still another object of the invention is a process for manufacturing the article as above detailed, comprising at least one of injection moulding, extrusion moulding, blow moulding, foam processing, compression moulding, casting and coating the composition (C) as above detailed.

All definitions and preferences provided in respect of the inventive composition (C) apply to the process for preparing the composition (C), to the process for manufacturing an article comprising the composition (C) as well as to the article itself.

The Applicant has found unexpectedly that the composition (C) of the present invention is effective in providing articles having improved wear resistance and low friction under very severe conditions such as notably extreme dry sliding conditions over prior art articles.

Should the disclosure of any patents, patent applications, and publications which are incorporated herein by reference conflict with the description of the present application to the extent that it may render a term unclear, the present description shall take precedence.

EXAMPLES

The invention will be now described in more details with reference to the following examples, whose purpose is merely illustrative and not intended to limit the scope of the invention.

Raw Materials

KETASPIRE® KT-880 [MFR (400° C./2.16 kg) is 39.5 g/10 min; MV (400° C., 1000 s-1) is 0.15 kPa·s; IV is 0.75 dl/g-0.77 dl/g] is an aromatic polyetheretherketone (PEEK) polymers commercially available from Solvay Specialty Polymers USA, LLC.

PEEK polymer blend containing 50 wt. % KETASPIRE® KT-880 polymer and 50 wt. % KETASPIRE® KT-820 polymer relative to total weight of PEEK polymer blend [MFR (400° C./2.16 kg) is 22.8 g/10 min].

PTFE: Polymist® XPP-511 is a polytetrafluoroethylene powdered resin, obtained from SOLVAY SPECIALTY POLYMERS ITALY S.p.A. having a D50 particle size of 20 μm, a melting point $T_{m(II)}$ of 329° C. The melt viscosity (MV) is equal to or lower than $1 \times 10^5$ Pa·s at 372° C. measured according to a modified ASTM D1238-52T method.

PTFE: Algoflon® L203 is a polytetrafluoroethylene powdered resin, obtained from SOLVAY SPECIALTY POLYMERS ITALY S.p.A. having a D50 particle size of 6 μm, a melting point $T_{m(II)}$ of 328° C. The melt viscosity (MV) is equal to or lower than $1 \times 10^5$ Pa·s at 372° C. measured according to a modified ASTM D1238-52T method.

PTFE: Polymist® F5-A is a polytetrafluoroethylene powdered resin, obtained from SOLVAY SPECIALTY POLYMERS ITALY S.p.A. having a D50 particle size of 4 μm, a melting point $T_{m(II)}$ of 326° C. The melt viscosity (MV) is equal to or lower than $1 \times 10^5$ Pa·s at 372° C. measured according to a modified ASTM D1238-52T method.

PTFE: 3M™ Dyneon™ J14 is a polytetrafluoroethylene powdered resin, obtained from 3M™ Dyneon™, average particle size is 6 μm, a melting point $T_{m(II)}$ of 321° C. The melt viscosity (MV) is equal to or lower than $1 \times 10^5$ Pa·s at 372° C. measured according to a modified ASTM D1238-52T method.

Carbon fiber: PAN-CF; Chopped, obtained as SIGRAFIL® C30 006 APS from SGL Carbon Fibers Ltd., length 3-6 mm.

The Following Characterizations Carried Out on the Materials of the Examples are Indicated Hereinafter:

Melt Flow Rate (MFR)

The melt flow rate (MFR) of the (PTFE) polymer is measured at 372° C. and under a load of 10 kg and of the PEEK polymer at 400° C. and under a load of 2.16 kg, both in accordance with ASTM method D1238.

The melt flow rate (MFR) of polymer composition is measured at 400° C. and under a load of 5 kg, in accordance with ASTM method D1238.

Viscosity Measurements

The melt viscosity (MV) of the (PTFE) polymer is measured at 372° C. in accordance with the procedure ASTM D-1238-52T modified as notably described in U.S. Pat. No. 4,380,618: the cylinder, orifice and piston tip are made of a corrosion-resistant alloy, Haynes Stellite 19, made by Haynes Stellite Co. The 5.0 g sample is charged to the 9.53 mm (0.375 inch) inside diameter cylinder, which is maintained at 372° C. Five minutes after the sample is charged to the cylinder, it is extruded through a 2.10 mm (0.0825 inch) diameter, 8.00 mm (0.315 inch) long square-edge orifice under a load (piston plus weight) of 5000 grams. This corresponds to a shear stress of 44.8 KPa (6.5 pounds per square inch). The melt viscosity in poises is calculated as 53170 divided by the observed extrusion rate in grams per minute.

Melt viscosity (MV) measurements of PEEK polymers were made with a capillary rheometer according to ASTM D3835. Readings were taken at 400° C. using a die with the following characteristics: diameter: 1.016 mm, length: 20.32 mm, cone angle 120° and a shear rate of 1000 $s^{-1}$.

The viscosity of a melt of KETASPIRE® KT-880 PEEK polymers was also measured as a function of shear rate at several temperatures using an LCR-7000 Capillary Rheometer and using a die with the following characteristics: diameter: 1.016 mm, length: 20.32 mm, cone angle 120°, as shown in Table 1 below:

TABLE 1

| Shear Rate (1/s) | Visc. (kPa · s) at 400° C. |
|---|---|
| 100.2 | 0.225 |
| 400.9 | 0.187 |
| 1002.3 | 0.154 |
| 2505.7 | 0.121 |
| 5011.5 | 0.960 |
| 7015.9 | 0.850 |
| 10022.8 | 0.710 |

Reduced viscosity (RV) of the PEEK polymers were measured in 95-98% sulfuric acid (d=1.84 g/ml) at a polymer concentration of 1 g/100 ml at 25° C. using a Cannon-Fenske viscometer tube (No. 50) according to ASTM D2857.

Intrinsic viscosity (IV) of the PEEK polymers were measured in 95-98% sulfuric acid (d=1.84 g/ml) at a polymer concentration of 0.1 g/100 ml at 25° C. using a Cannon-Fenske viscometer tube (No. 50) according to ASTM D2857.

The second melting temperature ($T_{m(II)}$ melting point)

The second melting temperature was measured according to the ASTM D3418 method which has been modified in such a way that the heating and cooling steps are carried out as shown in Table 1 below:

TABLE 1

| Step # | |
|---|---|
| 1 | Heat to 250° C. at 50° C./minute |
| 2 | Heat from 250° C. to 380° C. at 10° C./minute |
| 3 | Hold for 2 minutes |
| 4 | Cool from 380° C. to 250° C. at 10° C./minute |
| 5 | Hold for 2 minutes |
| 6 | Heat from 250° C. to 380° C. at 10° C./minute |
| 7 | Hold for 2 minutes |
| 8 | Cool down |

The melting point observed at the second heating period was recorded and is hereby referred to as the melting point of the (PTFE) polymer ($T_{m(II)}$)

Mechanical Properties

The mechanical properties of the PEEK/PTFE/CF polymer compositions prepared were tested according to ISO standards using the type 1A (ISO 3167) test specimens.

The various ISO tests employed were the following:
Flexural Strength and Modulus: ISO178
Tensile Strength and Modulus: ISO 527
Notched Izod Impact: ISO 180 The mechanical properties are summarized in Table 2

Friction and Wear Behavior

The friction and wear behavior of the samples were evaluated according to the GM plastic material specification test, in particular per the "sequence B" protocol (high speed and low pressure) of the wear test GMW16771, by using a Tribometer, incorporated herein by reference in its entirety. The testing was carried out after break-in by running each step in the order as specified in the specification test. The duration at each step was 5 minutes at the specified load and speed followed by stopping for 30 minutes before going to the next test step. The test specimens consisted of three 0.25"×0.25"×0.13" square pins located 120° apart on a 0.938" mean sample diameter circle and the mating surface was a standard ASTM washer per ASTM D3702 standard.

The wear testing involved the study of the limiting pressure and velocity (PV-limit, psi·ft/min) values of the test specimen, as described above. The PV limit values are summarized in Table 2.

The load and velocity bearing capability of the polymer composition may be expressed as that combination of load and speed at which the coefficient of friction or the interface temperature of a bearing surface fails to stabilize. As used herein, the term "PV limit" will be used to denote the pressure-velocity relationship determined by the combination of load and speed at which the coefficient of friction (COF, μ) or the interface temperature of the tensile bar surface fails to stabilize, expressed by the product of the unit pressure P (psi) based upon the contact area and the linear velocity V or speed (ft/min);(psi·ft/min).

General Description of the Compounding Process of the PEEK/PTFE/CF Polymer Compositions A dry blend of PEEK polymer with the desired amounts of PTFE polymer was first prepared by tumble blending. The pre-blended mixture was then fed into the main hopper (barrel 1) of a Berstorff 25 mm twin screw extruder. The desired amounts of carbon fiber (CF) were fed gravimetrically into side-feeder 1 fixed at barrel 5. The extruder had an L/D ratio of 44 and a total of 8 barrel sections and a vacuum vent located at barrel section 7. The extrudate was cut into pellets for molding.

Standard Type 1A (ISO 3167) test specimen bars were injection molded and used for all mechanical and friction and wear testing. All samples requiring specimen sizes different from type 1A bars were cut to the desired size specified by the test.

Composition of the different polymer compositions are summarized in tables 2 and 4.

TABLE 2

| Polymer composition | | Examples No | | | | | |
|---|---|---|---|---|---|---|---|
| | | C1 | C2 | C3 | 4 | C5 | 6 |
| Polymer composition | KETASPIRE ® KT-880 PEEK polymer (wt. %) | 70 | 70 | 70 | 70 | | |
| | PEEK polymer blend $^{(a)}$ (wt. %) | | | | | 70 | 70 |
| | Algoflon ® L203 PTFE (wt. %) | 15 | | | | 15 | |
| | Polymist ® XPP-511 PTFE (wt. %) | | 15 | | | | |
| | Polymist ® F5-A PTFE (wt. %) | | | 15 | | | |
| | 3M™ Dyneon™ J14 PTFE (wt. %) | | | | 15 | | 15 |
| | Carbon fiber (wt. %) Pan-CF | 15 | 15 | 15 | 15 | 15 | 15 |
| PTFE properties | $T_{m(II)}$ melting point (° C.) | 329 | 328 | 326 | 321 | 329 | 321 |
| | D50 particle size (μm) | 6 | 20 | 4 | 6 | 6 | 6 |
| Polymer composition properties | MFR [400° C./5 kg] (g/10 min) | 33 | 36 | 47 | 64 | 13 | 21 |
| | PV limit (psi · ft/min) | 225,000 | 233,333 | 266,667 | 350,000 | 283,333 | 383,333 |
| | Flexural Strength (MPa) | 241 | 243 | 256 | 255 | — | — |
| | Flexural Modulus (MPa) | 12200 | 12600 | 13000 | 13400 | — | — |
| | Tensile Strength (MPa) | 170 | 175 | 176 | 177 | — | — |

TABLE 2-continued

| Polymer composition | Examples No | | | | | |
|---|---|---|---|---|---|---|
| | C1 | C2 | C3 | 4 | C5 | 6 |
| Tensile Modulus (MPa) | 16100 | 15700 | 15600 | 16400 | — | — |
| Notched Izod Impact (KJ/m$^2$) | 6.49 | 6.41 | 6.65 | 7.01 | — | — |

(a) PEEK polymer blend containing 50 wt. % KETASPIRE ® KT-880 polymer and 50 wt. % KETASPIRE ® KT-820 polymer relative to total weight of PEEK polymer blend [MFR (400° C./2.16 kg) is 22.8 g/10 min]

The extrusion conditions are summarized in table 3.

TABLE 3

Screw Diameter: 25 mm
Screw Speed: 180 rpm
L/D = 44

| Zone | Name | $T_{Barrel}$ [° C.] |
|---|---|---|
| 1 | Barrel 1 | 30 |
| 2 | Barrel 2 | 320 |
| 3 | Barrel 3 | 320 |
| 4 | Barrel 4 | 330 |
| 5 | Barrel 5 | 330 |
| 6 | Barrel 6 | 330 |
| 7 | Barrel 7 | 340 |
| 8 | Barrel 8 | 340 |
| 9 | Adapter | 340 |
| 10 | Die plate | 340 |

TABLE 4

| Polymer composition | | Examples No | | | | | |
|---|---|---|---|---|---|---|---|
| | | C7 | 8 | C9 | 10 | C11 | 12 |
| Polymer composition | KETASPIRE ® KT-880 PEEK polymer (wt. %) | 80 | 80 | 55 | 55 | 65 | 65 |
| | Algoflon ® L203 PTFE (wt. %) | 10 | | 15 | | 25 | |
| | 3M ™ Dyneon ™ J14 PTFE (wt. %) | | 10 | | 15 | | 25 |
| | Carbon fiber (wt. %) Pan-CF | 10 | 10 | 30 | 30 | 10 | 10 |
| PTFE properties | $T_{m(II)}$ melting point (° C.) | 329 | 321 | 329 | 321 | 329 | 321 |
| | D50 particle size (μm) | 6 | 6 | 6 | 6 | 6 | 6 |
| Polymer composition properties | MFR [400° C./5 kg] (g/10 min) | 42 | 57 | 16 | 25 | 30 | 88 |
| | PV limit (psi · ft/min) | 250,000 | 366,667 | 250,000 | 300,000 | 233,333 | 383,333 |

The invention claimed is:

1. A composition (C) comprising:
   a. from 20 to 80% by weight (wt. %) of at least one poly(aryl ether ketone) polymer, (PAEK$_{HMF}$) polymer, having a melt flow rate (MFR) from 15 g/10 min to 80 g/10 min at 400° C. and under a load of 2.16 kg, as measured in accordance with ASTM method D1238;
   b. from 12 to 30 wt. % of at least one poly(tetrafluoroethylene) polymer, (PTFE) polymer, having a D50 particle size from 2 to 8 μm, and having a melting temperature ($T_{mII}$) from 321° C. to about 324° C.; and
   c. from 10 to 30 wt. % of at least one carbon fiber,
   and wherein all wt. % are based on a total weight of the composition (C).

2. The composition (C) according to claim 1, wherein more than 50% moles of recurring units of the (PAEK$_{HMF}$) polymer are recurring units (R$_{PAEK\_HMF}$) selected from the group consisting of formulae (J-A) to (J-O):

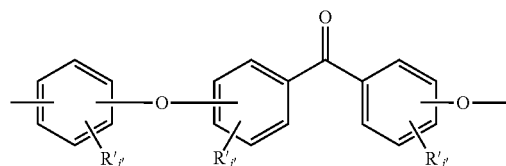 (J-A)
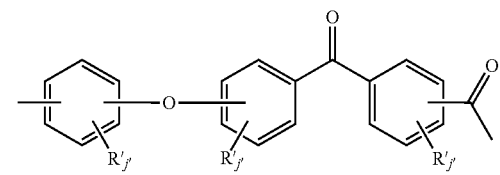 (J-B)
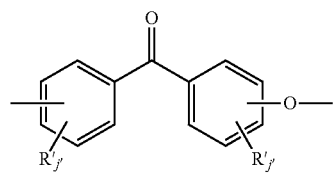 (J-C)
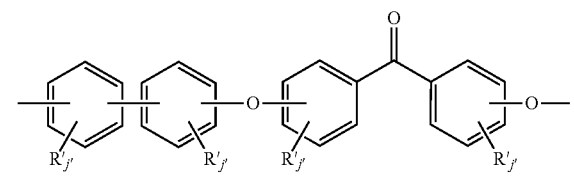 (J-D)
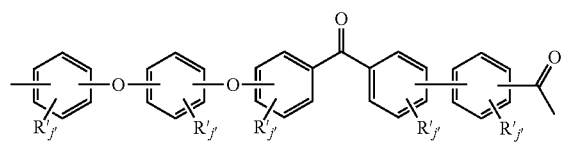 (J-E)
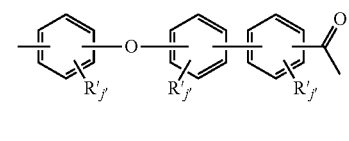 (J-F)
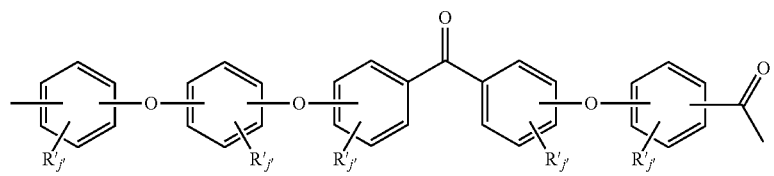 (J-G)
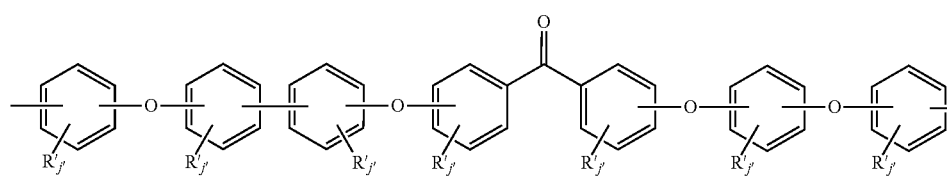 (J-H)
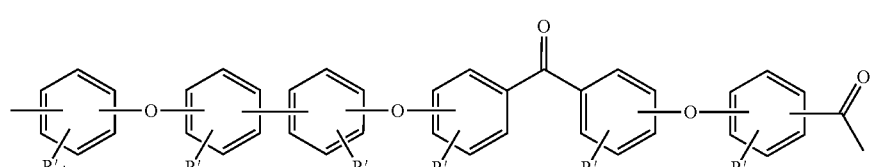 (J-I)
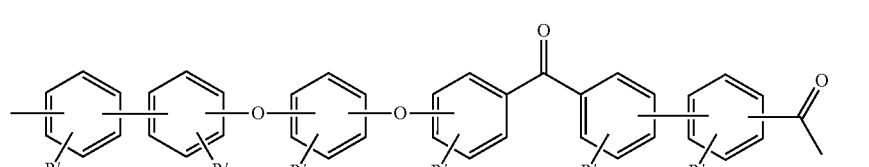 (J-J)
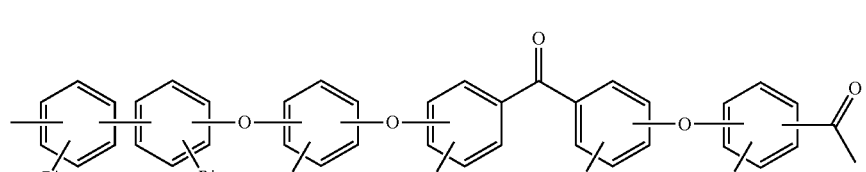 (J-K)
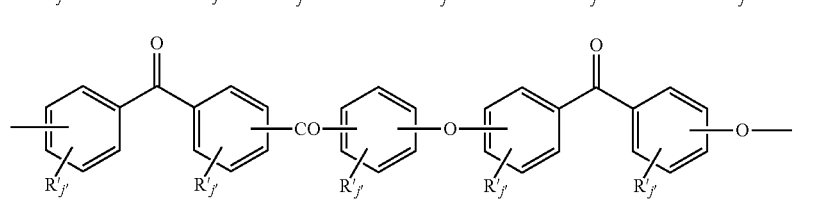 (J-L)

-continued

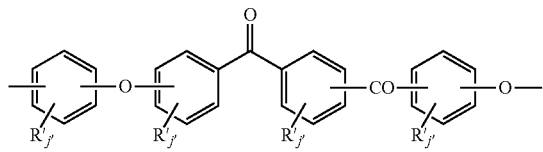
(J-M)

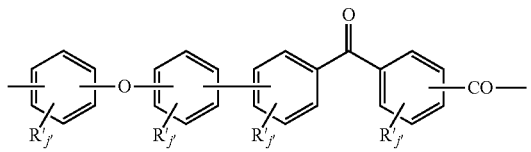
(J-N)

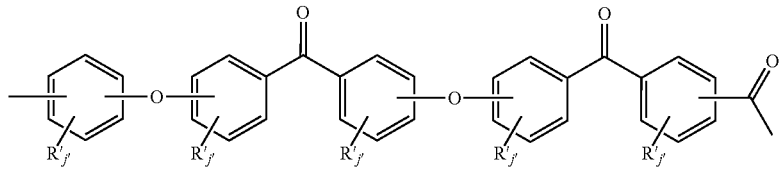
(J-O)

wherein:
- each of R', equal to or different from each other, is selected from the group consisting of halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium; and
- j' is zero or is an integer from 0 to 4.

3. The composition (C) according to claim 2, wherein the $(PAEK_{HMF})$ polymer is a polyetheretherketone polymer, $(PEEK_{HMF})$ polymer, and the $(PAEK_{HMF})$ polymer comprises more than 50 wt. % of recurring units $(R_{PAEK\_HMF})$ of formula J'-A.

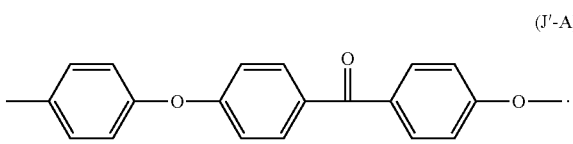
(J'-A)

4. The composition (C) according to claim 1 comprising from 55 to 75 wt. % of the $(PAEK_{HMF})$ polymer, based on a total weight of the composition (C).

5. The composition (C) according to claim 1, wherein the melt flow rate (MFR) of the $(PAEK_{HMF})$ polymer is from 38 g/10 min to 45 g/10 min at 400° C. and under a load of 2.16 kg, as measured in accordance with ASTM method D1238.

6. The composition (C) according to claim 1, wherein the (PTFE) polymer has a D50 particle size from 3 μm to 7 μm.

7. The composition (C) according to claim 1, wherein the carbon fiber is selected from the group of PAN-based carbon fibers (PAN-CF), pitch based carbon fibers, graphitized pitch-based carbon fibers, and mixtures thereof.

8. The composition (C) according to claim 7, wherein the carbon fiber is a PAN-based carbon fiber.

9. The composition (C) according to claim 1 comprising from 10 to 20 wt. % of the carbon fiber, based on a total weight of the composition (C).

10. A process for manufacturing the polymer composition (C) according to claim 1, the process comprises mixing:
- d. the at least one $(PAEK_{HMF})$ polymer;
- e. the at least one (PTFE) polymer;
- f. the at least one carbon fiber; and
- g. optionally, at least one other ingredient (I).

11. The process according to claim 10 comprising mixing the $(PAEK_{HMF})$ polymer, the (PTFE) polymer, the carbon fiber, and optionally, the other ingredients (I) by dry blending and/or melt compounding.

12. The process according to claim 10, wherein the $(PAEK_{HMF})$ polymer, the (PTFE) polymer, the carbon fiber, and optionally, the other ingredients (I) are melt compounded in continuous or batch devices.

13. An article comprising the composition (C) according to claim 1.

14. The article according to claim 13, wherein the article is a bearing article.

15. A process for manufacturing an article comprising at least one step of injection moulding, extrusion moulding, blow moulding, foam processing, compression molding, casting and coating the composition (C) according to claim 1.

16. The composition (C) according to claim 1, wherein the D50 particle size is measured by dynamic or laser light scattering techniques or using screen analysis according to DIN 53196.

17. The composition (C) according to claim 1, wherein the (PTFE) polymer has a number average molecular weight (Mn) equal to or below 200,000.

18. The composition (C) according to claim 1, wherein the (PTFE) polymer has a number average molecular weight (Mn) equal to or below 20,000.

* * * * *